United States Patent
Hagiwara et al.

(10) Patent No.: US 10,343,209 B2
(45) Date of Patent: Jul. 9, 2019

(54) METHOD OF MANUFACTURING BEARING UNIT, AND ROTARY PRESS DEVICE

(71) Applicant: NSK LTD., Tokyo (JP)

(72) Inventors: Nobuyuki Hagiwara, Fujisawa (JP); Toshio Nakamura, Fujisawa (JP); Hiroshi Koyama, Fujisawa (JP); Isao Shintou, Fujisawa (JP); Kazuto Kobayashi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/553,425

(22) PCT Filed: Feb. 29, 2016

(86) PCT No.: PCT/JP2016/056019
§ 371 (c)(1),
(2) Date: Aug. 24, 2017

(87) PCT Pub. No.: WO2016/140178
PCT Pub. Date: Sep. 9, 2016

(65) Prior Publication Data
US 2018/0043417 A1 Feb. 15, 2018

(30) Foreign Application Priority Data

Mar. 2, 2015 (JP) ................. 2015-039982

(51) Int. Cl.
*B60B 27/00* (2006.01)
*B21D 53/10* (2006.01)
(Continued)

(52) U.S. Cl.
CPC .............. *B21D 53/10* (2013.01); *B21J 9/025* (2013.01); *B21K 1/30* (2013.01); *B21K 1/40* (2013.01);
(Continued)

(58) Field of Classification Search
CPC .......... B60B 27/0005; B60B 2310/211; B21D 53/10; C21D 9/40; F16C 33/64; Y10T 29/49689
See application file for complete search history.

(56) References Cited

U.S. PATENT DOCUMENTS

| 4,893,960 A | 1/1990 | Beier et al. |
| 9,005,507 B2 * | 4/2015 | Morello ................. B21K 21/12 264/293 |

(Continued)

FOREIGN PATENT DOCUMENTS

| CN | 2730517 Y | 10/2005 |
| CN | 102026825 A | 4/2011 |

(Continued)

OTHER PUBLICATIONS

International Search Report for PCT/JP2016/056019, dated Apr. 19, 2016 (PCT/ISA/210).

(Continued)

*Primary Examiner* — Rick K Chang
(74) *Attorney, Agent, or Firm* — Sughrue Mion, PLLC

(57) ABSTRACT

A rotary press device (33) includes a restriction section (36) configured to restrict a motion of a roll (30) around a central axis of a roll (30) against movement of the roll (30) around a central axis of a hub main body (8) during rotary forging. In an example, the restriction section (36) has guide teeth (44) meshed with teeth formed on a processing surface of the roll (30).

3 Claims, 13 Drawing Sheets

(51) Int. Cl.
*F16C 43/04* (2006.01)
*F16C 19/18* (2006.01)
*B21J 9/02* (2006.01)
*B21K 1/30* (2006.01)
*B21K 1/40* (2006.01)
*B21K 1/76* (2006.01)
*F16D 1/076* (2006.01)
*F16D 3/223* (2011.01)

(52) U.S. Cl.
CPC .............. *B21K 1/765* (2013.01); *B60B 27/00* (2013.01); *B60B 27/0031* (2013.01); *B60B 27/0084* (2013.01); *F16C 19/186* (2013.01); *F16C 43/04* (2013.01); *F16D 1/076* (2013.01); *F16C 2326/02* (2013.01); *F16D 2003/22326* (2013.01)

(56) References Cited

U.S. PATENT DOCUMENTS

2012/0267944 A1   10/2012   Toda et al.
2015/0231920 A1   8/2015    Matsunaga et al.

FOREIGN PATENT DOCUMENTS

| | | |
|---|---|---|
| CN | 202028729 U | 11/2011 |
| CN | 103028687 A | 4/2013 |
| EP | 2 551 032 A1 | 1/2013 |
| JP | 55-066032 U | 5/1980 |
| JP | 02-197345 A | 8/1990 |
| JP | 2009-292422 A | 12/2009 |
| JP | 2012-223803 A | 11/2012 |
| JP | 2013-215738 A | 10/2013 |
| JP | 2014-077527 A | 5/2014 |
| JP | 2016-030260 A | 3/2016 |

OTHER PUBLICATIONS

Communication dated Sep. 28, 2018, from the State Intellectual Property Office of People's Republic of China in counterpart Application No. 201680012925.5.

Extended European Search Report dated Nov. 20, 2018, from the European Patent Office in counterpart Application No. 16758871.4.

* cited by examiner

ONE SIDE OF AXIAL DIRECTION

METHOD OF MANUFACTURING BEARING UNIT, AND ROTARY PRESS DEVICE

CROSS REFERENCE TO RELATED APPLICATIONS

This application is a National Stage of International Application No. PCT/JP2016/056019 filed Feb. 29, 2016, claiming priority based on Japanese Patent Application No. 2015-039982, filed Mar. 2, 2015, the contents of all of which are incorporated herein by reference in their entirety.

TECHNICAL FIELD

The present invention relates to a method of manufacturing a bearing unit, and a rotary press device.

Priority is claimed on Japanese Patent Application No. 2015-039982, filed Mar. 2, 2015, the contents of which are incorporated herein by reference.

BACKGROUND ART

Patent Literature 1 discloses a bearing unit having a face spline for power transmission installed on an end surface of an inner wheel. In the related art, in processing of a face spline, a rotary press device (a rotary pressing machine, a rotary forging machine) is used.

CITATION LIST

Patent Literature

[Patent Literature 1]
Japanese Unexamined Patent Application, First Publication No. 2009-292422

SUMMARY OF INVENTION

Technical Problem

An object of the present invention is to provide a method of manufacturing a bearing unit, and a rotary press device, which are advantageous in improvement of quality.

Solution to Problem

In an aspect of the present invention, a roll bearing unit includes a hub main body and an inner wheel. The hub main body has an inner wheel trajectory close to one side of the axial direction and formed on an outer circumferential surface of an intermediate section of the hub main body in an axial direction. In addition, the inner wheel has an inner wheel trajectory on an outer circumferential surface of the inner wheel at the other side of the axial direction and that is fitted onto a portion of the hub main body close to the other end in the axial direction. The other end surface of the inner wheel in the axial direction is pressed to support and fix the inner wheel to the hub main body using a caulking section formed by plastically deforming a cylindrical portion formed on the other end portion of the hub main body in the axial direction outward in a radial direction. In addition, a hub-side face spline serving as a concavo-convex section in a circumferential direction is formed on the other end surface of the caulking section in the axial direction. More specifically, the roll bearing unit further includes an outer wheel having a plurality of rows of outer wheel trajectories on an inner circumferential surface thereof, and a plurality of rolling elements rollably installed between both of the outer wheel trajectories and both of the inner wheel trajectories. In the method of manufacturing the roll bearing unit, the hub-side face spline serving as a concavo-convex section in the circumferential direction is formed by performing rotary forging that rotates the roll about the central axis of the hub main body in a state in which a processing surface of the roll inclined with respect to the central axis of the hub main body and rotatably (autorotatably) supported about the central axis thereof is pressed against the other end surface of the caulking section in the axial direction.

In the method of manufacturing the roll bearing unit, during the rotary forging, the hub-side face spline is formed on the other end surface of the caulking section in the axial direction in a state in which a motion of the roll around the central axis of the roll is restricted against movement of the roll around the central axis of the hub main body.

In an example, the other end surface of the caulking section in the axial direction is surrounded by guide teeth serving as a concavo-convex section in the circumferential direction, and the guide teeth and some of teeth formed on the processing surface of the roll (for example, an outer half section in the radial direction) can be meshed with each other.

In an example, the guide teeth can be displaceably supported in the axial direction in a state in which an elastic force is applied toward the other side in the axial direction.

In addition, a motion of the roll around the central axis of the roll can be restricted against movement of the roll around the central axis of the hub main body during the rotary forging by engagement between a tip portion of a pin formed on a portion that is not rotated in the radial direction even during the rotary forging and an engaging concave section formed in an outer circumferential surface of the roll.

In addition, an elastic member such as a coil spring or the like is installed between a support arm section supported at a portion that is not rotated even during the rotary forging and one place on the outer circumferential surface of the roll in the circumferential direction, and one place on the outer circumferential surface of the roll in the circumferential direction is elastically pulled toward the support arm section regardless of a rotational position of the roll about the central axis of the hub main body. Accordingly, a motion of the roll around the central axis of the roll can be restricted against movement of the roll around the central axis of the hub main body during the rotary forging.

In another aspect of the present invention, a rotary press device includes a roll rotatably supported about a central axis thereof inclined with respect to a central axis of the hub main body. The rotary press device further includes a restriction section configured to restrict a motion of the roll around the central axis of the roll against movement of the roll around the central axis of the hub main body during the rotary forging.

In an example, the restriction section may include guide teeth serving as a concavo-convex section in the circumferential direction surrounding the other end surface of the caulking section in the axial direction. The guide teeth are meshed with teeth formed on the processing surface of the roll (for example, an outer half section in the radial direction). The guide teeth can be displaceably supported in the axial direction in a state in which an elastic force is applied toward the other side in the axial direction.

In addition, the restriction section may include an engaging pin formed on a portion that is not rotated even during the rotary forging in the radial direction of the hub main body and an engaging concave section formed in an outer circumferential surface of the roll. During the rotary forging, the engaging pin and the engaging concave section are engaged with each other on at least one position in the rotation direction of the roll about the central axis of the hub main body without rattling in the rotation direction.

In addition, the restriction section may include a support arm section supported at a portion that is not rotated even during the rotary forging and an elastic member installed between the support arm section and one position on the outer circumferential surface of the roll in the circumferential direction. The elastic member elastically pulls one place on the outer circumferential surface of the roll in the circumferential direction toward the support arm section during the rotary forging regardless of a rotational position of the roll about the central axis of the hub main body.

In another aspect of the present invention, a method of manufacturing a bearing unit includes setting a bearing unit to a holder such that a central axis of an inner wheel coincides with a first axis; relatively pressing a roll with respect to the inner wheel in a state in which a central axis of the roll having teeth for processing a face spline is inclined with respect to the first axis; and performing relative movement between the bearing unit and the roll in a state in which movement of the teeth around the first axis is restricted in parallel with the relative pressing.

In another aspect of the present invention, the rotary press device includes a holder that holds a bearing unit such that a central axis of an inner wheel coincides with a first axis; a roll having teeth for processing a face spline; a first driving apparatus that performs relatively pressing the roll with respect to the inner wheel in a state in which a central axis of the roll is inclined with respect to the first axis; a second driving apparatus that performs relative movement between the bearing unit and the roll in parallel with the relative pressing; and a restriction section that restricts movement of the teeth around the first axis.

Advantageous Effects of Invention

According to the aspect of the present invention, it is possible to provide a method of manufacturing a bearing unit, and a rotary press device, which are advantageous in improvement of quality.

DESCRIPTION OF EMBODIMENTS

Figure 11:
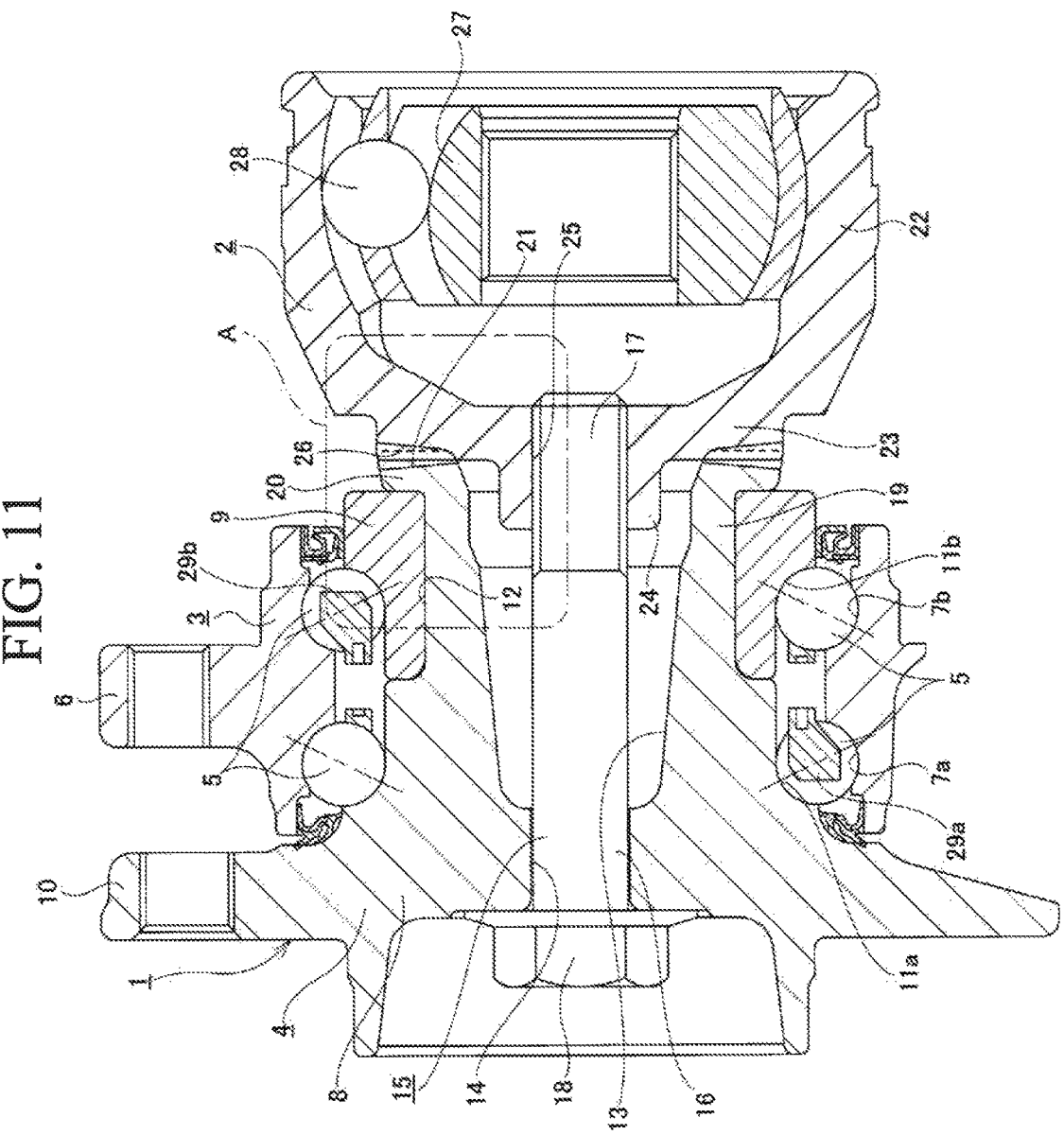
FIG. 11 is a cross-sectional view showing an example of a wheel drive bearing unit in which a wheel support bearing unit serving as a kind of a roll bearing, which is a target of the present invention, is incorporated.

FIG. 11 is a view showing a wheel drive bearing unit disclosed in Patent Literature 1. The unit is a kind of a bearing unit serving as a target of the present invention, and has a structure in which a roll bearing unit configured to support a wheel is incorporated. As shown in FIG. 11, the wheel drive bearing unit is formed by assembling a roll bearing unit 1 and an outer wheel 2 for a constant velocity joint. The roll bearing unit 1 includes an outer wheel 3, a hub 4, and a plurality of rolling elements (in the example shown, balls) 5 and 5.

The outer wheel 3 has a flange 6 formed on an outer circumferential surface at a standstill side, and a plurality of rows of outer wheel trajectories 7a and 7b formed in an inner circumferential surface. In addition, the hub 4 is formed by assembling a hub main body 8 and an inner wheel 9. The hub main body 8 has a flange 10 formed on the side rotating on a part of the outer circumferential surface close to one end in an axial direction. In addition, an inner wheel trajectory 11a close to one side of the axial direction is formed in an intermediate section of the hub main body 8 in the axial direction. In addition, a small diameter step section 12 is formed in the other end portion of the hub main body 8 in the axial direction. In addition, the hub main body 8 has a center hole 13 formed in a central section thereof.

Further, "an axial direction," "a radial direction" and "a circumferential direction" respectively refer to directions related to the hub main body unless it is specifically noted. In addition, "one side" in the axial direction represents an outer side in a widthwise direction of a vehicle in a state in which a bearing unit is attached to an automobile, and it represents a left side of FIG. 11 and a lower side of FIGS. 2, 5, 8 and 10. In addition, conversely, a right side of FIG. 11 and an upper side of FIGS. 2, 5, 8 and 10 that are central sides of a vehicle in a state in which a wheel drive bearing unit is assembled in an automobile are referred to as "the other side" in the axial direction. A small diameter section 14 through which a rod section 16 of a bolt 15 serving as a coupling member can be inserted via a predetermined guide gap is provided at one end portion of the center hole 13 in the axial direction. In addition, the inner wheel 9 has an inner wheel trajectory 11b formed on an outer circumferential surface in the axial direction at the other side, and is fitted onto the small diameter step section 12 of the hub main body 8 with an interference fit. In addition, the rolling elements 5 and 5 are installed between both of the outer wheel trajectories 7a and 7b and both of the inner wheel trajectories 11a and 11b such that the plurality of rolling elements 5 and 5 are rollable at each row of both. In addition, in this state, in a cylindrical portion 19 formed in the other end portion of the hub main body 8 in the axial direction, a caulking section 20 is formed by plastically deforming a portion of the inner wheel 9 protruding from the other end opening in the axial direction outward in the radial direction. As the other end surface of the inner wheel 9 in the axial direction is pressed down by the caulking section 20, an appropriate preload is applied to the rolling elements 5 and 5. In addition, a face spline 21 formed on the side of a hub and serving as a concavo-convex section in the circumferential direction is formed on the other end surface of the caulking section 20 in the axial direction throughout the circumference. Further, in the case of the example shown, a tooth tip surface of the face spline 21 formed on the side of the hub is a plane perpendicular to a central axis of the hub main body 8.

In addition, the outer wheel 2 for a constant velocity joint has a cup-shaped mouth section 22, an end wall section 23 serving as a bottom section of the mouth section 22, and a cylindrical shaft section 24 extending from a central section of the end wall section 23 toward one side in the axial direction. In addition, a center hole of the shaft section 24 forms a screw hole 25. In addition, a joint-side face spline 26 serving as a concavo-convex section in the circumferential direction is formed on a portion close to an outer circumference of one end surface of the end wall section 23 in the axial direction throughout the circumference. Further, in the case of the example shown, a tooth tip surface of the face spline 26 formed on the side of the joint is a plane perpendicular to a central axis of the outer wheel 2 for a constant velocity joint. In addition, the number of teeth of the face spline 26 formed on the side of the joint is the same as the number of teeth of the face spline 21 formed on the side of the hub.

In a state in which central axes of the hub main body 8 and the outer wheel 2 for a constant velocity joint coincide with each other, as the face splines 21 and 26 are meshed with each other, transmission of a rotational force between the hub main body 8 and the outer wheel 2 for a constant velocity joint are achieved. In addition, in this state, the rod section 16 of the bolt 15 is inserted through the small diameter section 14 of the center hole 13 of the hub main body 8 from one side in the axial direction, and a male screw section 17 formed on a tip portion of the rod section 16 is screwed into the screw hole 25 to be further fastened. Accordingly, in a state in which the hub main body 8 is sandwiched between a head section 18 of the bolt 15 and the outer wheel 2 for a constant velocity joint, the hub main body 8 and the outer wheel 2 for a constant velocity joint are coupled and fixed to each other.

When the wheel drive bearing unit configured as described above is assembled in a vehicle, the flange 6 of the outer wheel 3 is coupled and fixed to a suspension system and a rotary member for a brake such as a wheel (a drive wheel), a disk, and so on, is supported by and fixed to the flange 10 of the hub main body 8. In addition, a tip portion of a drive shaft (not shown) rotated and driven by an engine via a transmission is spline-engaged with the inside of an inner wheel 27 for a constant velocity joint installed inside the outer wheel 2 for a constant velocity joint. During travel of an automobile, rotation of the inner wheel 27 for a constant velocity joint is transmitted to the outer wheel 2 for a constant velocity joint and the hub main body 8 via a plurality of balls 28 to rotate and drive the wheel.

When the wheel support roll bearing unit 1 that constitutes the wheel drive bearing unit configured as described above is assembled, first, the outer wheel 3 is disposed around the hub main body 8, and the rolling elements 5 and 5 are held by a holder 29b installed at the other side in the axial direction between the outer wheel trajectory 7a at one side in the axial direction among both of the outer wheel trajectories 7a and 7b and the inner wheel trajectory 11a at one side in the axial direction. Next, the rolling elements 5 and 5 are held by a holder 29b installed at the other side in the axial direction at the surrounding of the inner wheel trajectory 11b of the other side in the axial direction formed on the outer circumferential surface of the inner wheel 9. In this state, the inner wheel 9 is fitted onto the small diameter step section 12 formed in the other end portion of the hub main body 8 in the axial direction with an interference fit. According to the fitting work, rolling surfaces of the rolling elements 5 and 5 (of a row of the other side in the axial direction) held by the holder 29b of the other side in the axial direction abut the outer wheel trajectory 7b of the other side in the axial direction formed on an inner circumferential surface of a portion close to the other end of the outer wheel 3 in the axial direction. Next, the cylindrical portion 19 formed on the other end portion of the hub main body 8 in the axial direction is plastically deformed outward in the radial direction to form the caulking section 20. As the other end surface of the inner wheel 9 in the axial direction is pressed down by the caulking section 20 in the axial direction, the inner wheel 9 is fixed to the hub main body 8.

Figure 12:
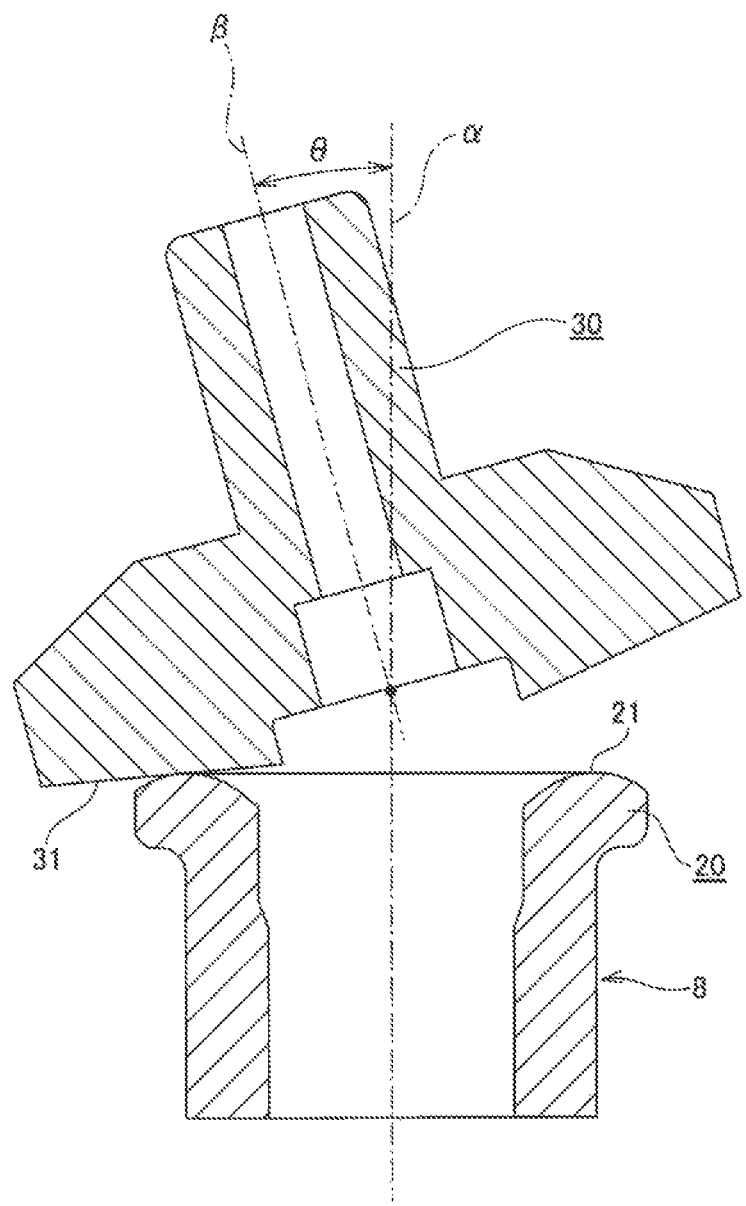
FIG. 12 is a cross-sectional view showing an example of a method of manufacturing a bearing unit for driving a wheel of the related art.

Further, as shown in FIG. 12, as rotary forging is performed on the other end surface of the caulking section 20 in the axial direction using a roll 30 having a central axis β inclined with respect to a central axis (a central axis of the roll bearing unit 1) α of the hub main body 8 by a predetermined angle θ, the face spline 21 installed on the side of the hub is formed. That is, a plurality of teeth are formed on a processing surface 31 serving as a tip surface (a lower end surface of FIG. 12) of the roll 30 at equal intervals in the circumferential direction. In a state in which the processing surface 31 of the roll 30 is pressed against the other end surface of the caulking section 20 in the axial direction, the roll 30 is rotated about the central axis α of the hub main body 8. Here, the roll 30 is supported rotatably about the central axis β thereof. Accordingly, in a state before the face spline 21 (i.e., a concavo-convex section in the circumferential direction) is formed on the other end surface of the caulking section 20 in the axial direction, when the roll 30 is rotated about the central axis α of the hub main body 8, the roll 30 is rotated (autorotated) about the central axis β thereof on the basis of frictional engagement between a tooth tip of a tooth of the processing surface 31 and the other end surface of the caulking section 20 in the axial direction. Meanwhile, when the roll 30 is rotated about the central axis α of the hub main body 8 after the face spline 21 is formed to a certain extent (a tooth depth of the face spline 21 is increased to a certain level), the roll 30 is autorotated on the basis of engagement (meshing) between the teeth formed on the processing surface 31 and the hub-side face spline 21. Then, a depth of the concave section that constitutes the face spline 21 is further increased, and processing is completed.

Figure 13:
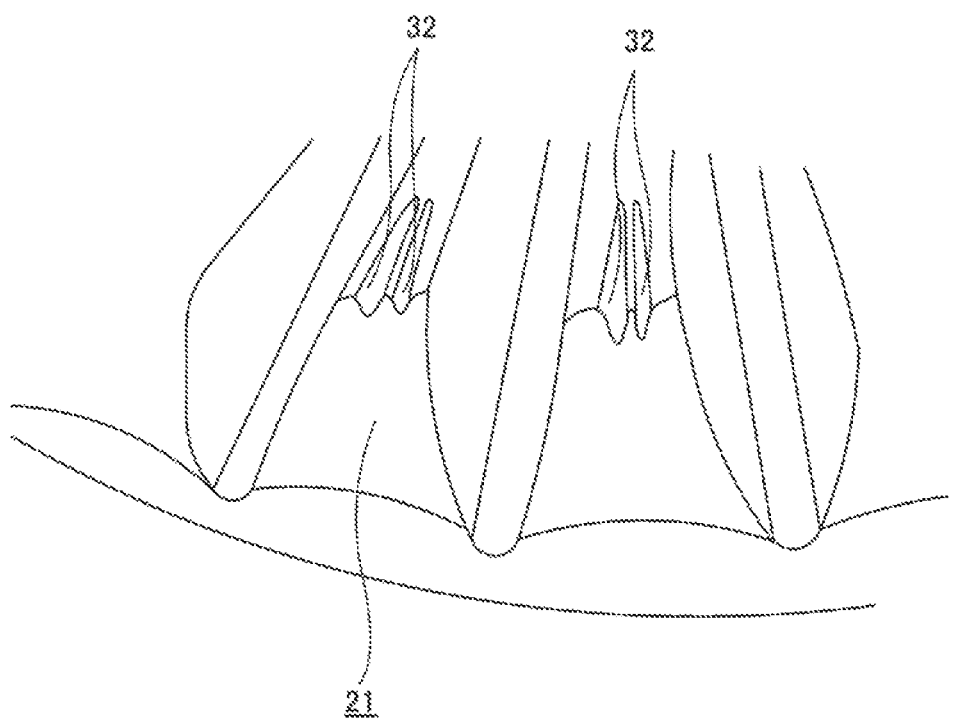
FIG. 13 is a partially enlarged perspective view for describing problems of a method of manufacturing a roll bearing unit of the related art.

In the case of the above-mentioned method of manufacturing the roll bearing unit 1, sliding in the circumferential direction may occur in an engaging section (a frictional engagement section or a meshing section) between the processing surface 31 and the other end surface of the caulking section 20 in the axial direction during rotary forging. The sliding in the circumferential direction is likely to occur in a state before the face spline 21 formed on the other end surface of the caulking section 20 in the axial direction on the side of the hub is formed to a certain extent. If the sliding in the circumferential direction occurs, whenever the roll 30 is rotated about the central axis α of the hub main body 8, a portion of the other end surface of the caulking section 20 in the axial direction pressed by the teeth formed on the processing surface 31 moves (deviates) in the circumferential direction. Then, when the portion of the other end surface of the caulking section 20 in the axial direction that becomes the tooth tip of the face spline 21 is pressed, depths of the stripes 32 and 32 are increased by radially forming one or a plurality of stripes (micro concave grooves) 32 and 32 and repeatedly pressing the portion as shown in FIG. 13. When the stripes 32 and 32 are present, a portion of the other end surface of the caulking section 20 in the axial direction is likely to be damaged (exfoliated). When the other end surface of the caulking section 20 in the axial direction is damaged, a meshed state between the face splines 21 and 26 deteriorates, generated metal powder intrudes into an internal space of the wheel support roll bearing unit 1, and a lifespan of the wheel support roll bearing unit 1 may be decreased.

The following embodiment is on the basis of new knowledge that radial stripes are formed on the tooth tip of the face spline by the sliding in the circumferential direction during rotary forging.

First Example of Embodiment

Figure 1:
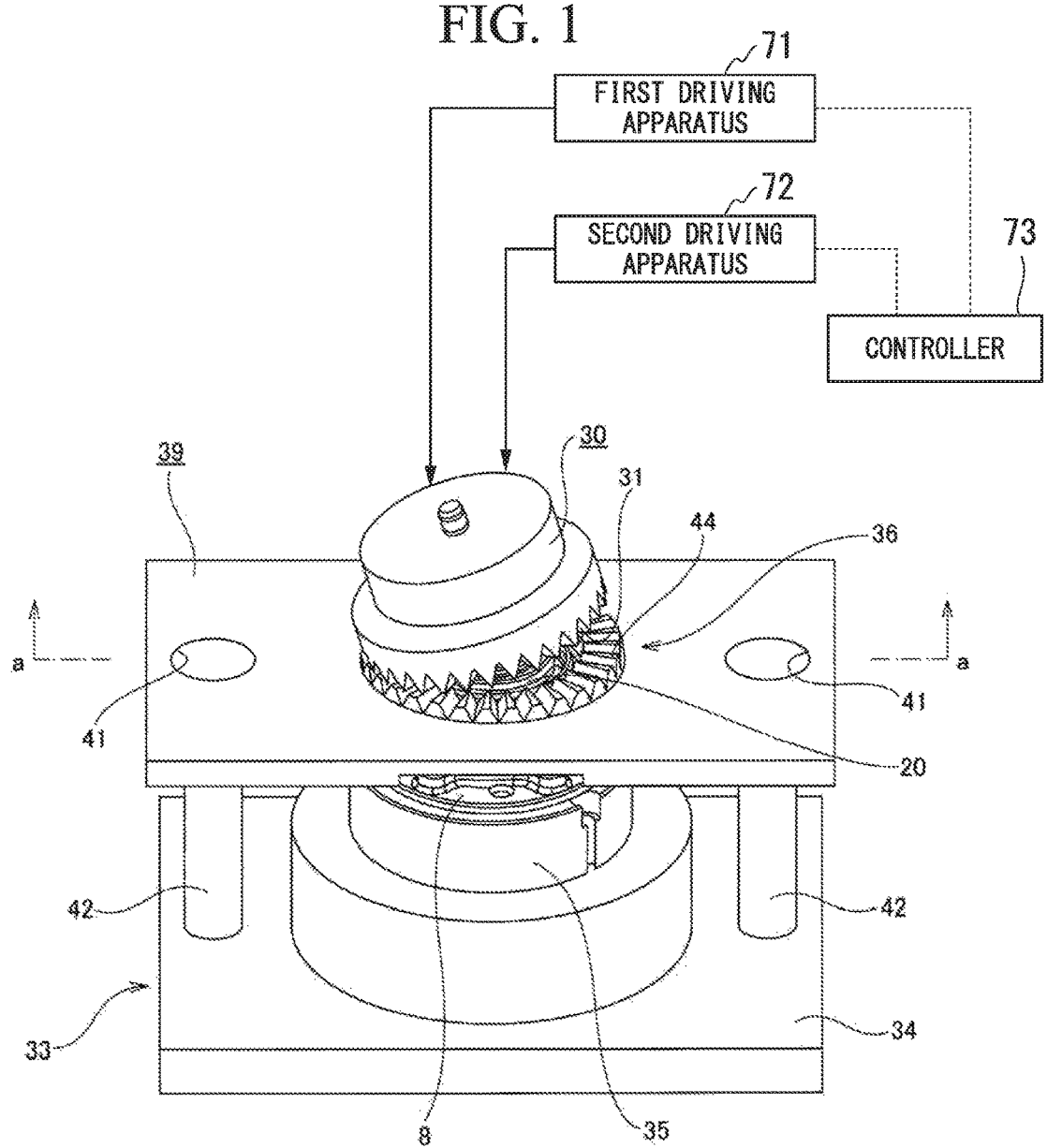
FIG. 1 is a perspective view showing a first example of an embodiment of the present invention.
Figure 2:
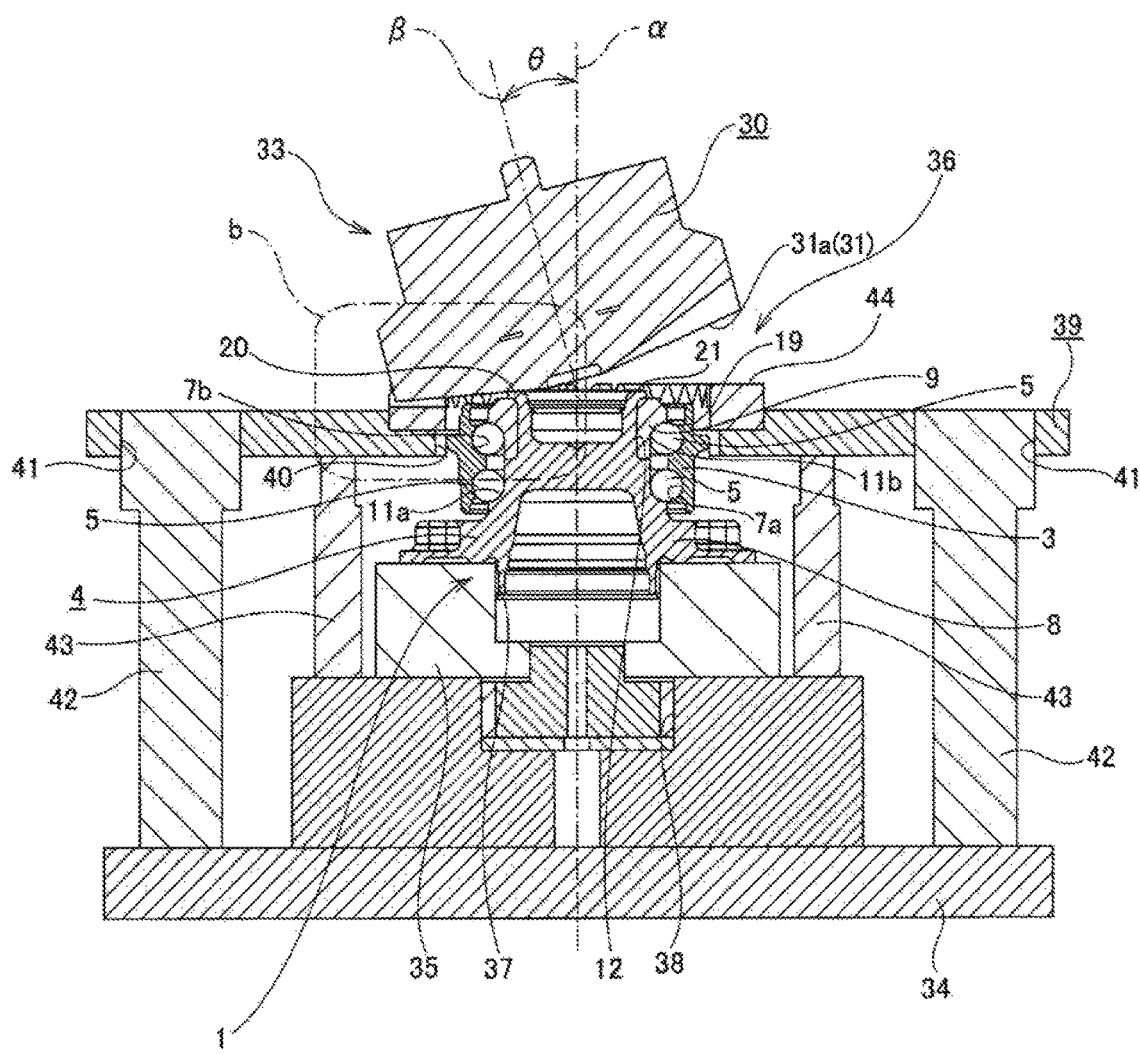
FIG. 2 is a cross-sectional view taken along line a-a of FIG. 1.
Figure 3:
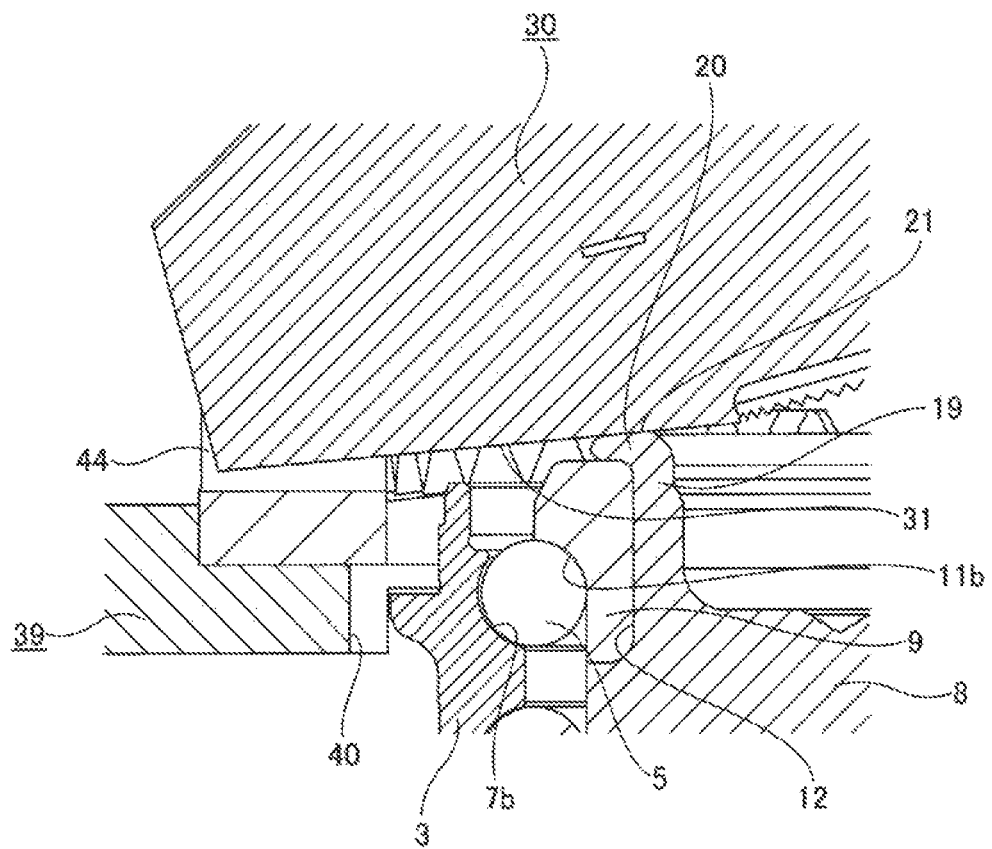
FIG. 3 is an enlarged view of a portion b of FIG. 2.

FIGS. 1 to 3 show a first example of the embodiment of the present invention. According to the aspect of the present invention, when the face spline 21 is formed on the side of the hub by performing rotary forging on the other end surface of the caulking section 20 in the axial direction, the radial stripes 32 and 32 (see FIG. 13) can be prevented from being formed on the tooth tip of the face spline 21. Since sequences or the like of manufacturing members that constitute the wheel support roll bearing unit 1 by performing plastic working such as forging or the like, cutting such as lathe turning or the like, and finishing such as polishing or the like, on a metal material, are the same as in the method of manufacturing the roll bearing unit, description thereof will be omitted.

In the case of the example, like the above-mentioned manufacturing method, the outer wheel 3 is disposed around the hub main body 8 and the plurality of rolling elements 5 and 5 are held by the holder 29a (see FIG. 11) installed at one side in the axial direction between the outer wheel trajectory 7a of one side in the axial direction and the inner wheel trajectory 11a of one side in the axial direction. Next, the rolling elements 5 and 5 are held by the holder 29b installed at the other side in the axial direction around the inner wheel trajectory 11b of the other side in the axial direction formed on the outer circumferential surface of the inner wheel 9. In this state, the inner wheel 9 is fitted onto the small diameter step section 12 formed on the other end portion of the hub main body 8 in the axial direction with an interference fit. According to the fitting work, the rolling surfaces of the rolling elements 5 and 5 arranged in a row at the other side in the axial direction are made to abut the outer wheel trajectory 7b of the other side in the axial direction formed on the inner circumferential surface of the portion of the outer wheel 3 close to the other end in the axial direction. Next, the cylindrical portion 19 formed on the other end portion of the hub main body 8 in the axial direction is plastically deformed outward in the radial direction to form the caulking section 20. The other end surface of the inner wheel 9 in the axial direction is pressed down by the caulking section 20 in the axial direction, and the inner wheel 9 is fixed to the hub main body 8. Further, rotary forging is performed on the other end surface of the caulking section 20 in the axial direction to form the face spline 21.

Rotary forging for forming the face spline 21 is performed using a rotary press device 33 as shown in FIGS. 1 to 3. The rotary press device 33 includes a base 34, a holder 35 supported by and fixed to a surface of the other side (an upper surface of FIG. 2) of the base 34 in the axial direction, the roll 30, a restriction section 36, a first driving apparatus 71, a second driving apparatus 72 and a controller 73. The holder 35 has a concave holding section 38 formed in the surface of the other side in the axial direction and into which a cylindrical portion 37 formed on one end portion of the hub main body 8 in the axial direction and referred to as a pilot section can be inserted without rattling. The bearing unit 8 is set on the holder 35 such that the central axis α of the hub main body (the inner wheel) 8 coincides with the central axis (the first axis) of the holder. The roll 30 is supported rotatably about the central axis (the second axis) β thereof inclined with respect to the central axis (the first axis) α of the hub main body 8 by the predetermined angle θ. The plurality of teeth 31a (teeth for processing a face spline) are formed on the processing surface 31 serving as the tip surface (the lower end surface of FIGS. 2 and 3) at equal intervals in the circumferential direction. In the case of the example, the number of teeth formed on the processing surface 31 is equal to the number of teeth of the face spline 21 which are to be formed on the other end surface of the caulking section 20 in the axial direction. The first driving apparatus 71 is configured to drive the roll 30 such that the roll 30 is relatively pressed with respect to the hub main body (the inner wheel) 8 in a state in which the central axis β of the roll 30 is inclined with respect to the first axis α. The second driving apparatus 72 is configured to perform relative movement between the hub main body 8 and the roll 30 such as movement of the roll 30 around the central axis α in parallel with the relative pressing. The controller 73 has a circuit and is configured to generally control the entire rotary press device 33.

The restriction section 36 is configured to restrict movement of the processing surface 31 (the teeth 31a) of the roll 30 around the first axis α during rotary forging. In an example, the restriction section 36 is configured to restrict motion of the roll 30 (for example, motion of the roll 30 around the central axis of the roll 30) against movement of the roll 30 around the central axis (the first axis) α of the hub main body 8. The second driving apparatus 72 is configured to perform relative movement between the hub main body 8 and the roll 30 such as movement of the roll 30 around the central axis α, or the like. Additionally and/or alternatively, the restriction section 36 is configured to force (cause) rotation (autorotation) of the roll 30 about the central axis β thereof according to rotation of the roll 30 about the central axis α of the hub main body 8. Additionally and/or alternatively, the restriction section 36 is configured to restrict rotation of the roll 30 about the central axis (the second central axis) β of the roll 30. In the case of the example, the restriction section 36 is disposed above the holder 35 to face the teeth 31a of the roll 30 and has guide teeth (restriction members) 44 having grooves corresponding to the teeth 31a. The restriction section 36 is installed between a floating plate 39 disposed around the caulking section 20 and the roll 30. The floating plate 39 has a circular hole 40 formed in a central section thereof and through which the other half section of the roll bearing unit 1 in the axial direction is inserted. In addition, a pair of through-holes 41 and 41 passing through the floating plate 39 in the thickness direction (the axial direction) are formed in the floating plate 39. Guide posts 42 and 42 implanted at the other side in the axial direction from the other side surface of the base 34 in the axial direction are engaged with (inserted through) the pair of through-holes 41 and 41 without rattling in a state in which a displacement in the thickness direction (the axial direction) of the floating plate 39 is allowable. In this state, an elastic force toward the other side in the axial direction is applied to the floating plate 39 by a mechanical cushion mechanism such as a spring or the like, hydraulic, gas pressure, or pneumatic cushion mechanisms 43 and 43, or the like, installed between the floating plate 39 and the holder 35 (the base 34). That is, the floating plate 39 is supported displaceably in the axial direction as in displacement to one side in the axial direction when a large force is applied to one side in the axial direction with respect to the base 34. Further, the guide teeth 44 that can be meshed with a half section of the teeth formed on the processing surface 31 on the side of the outer diameter are formed on the other side surface of the floating plate 39 in the axial direction around the circular hole 40. Further, the number of guide teeth 44 is equal to the number of teeth formed on the processing surface 33.

When the rotary forging is performed using such rotary press device 33, first, in a state in which the cylindrical portion 37 of the hub main body 8 is inserted into the concave holding section 38 of the holder 35 without rattling, the roll bearing unit 1 is held by the holder 35 without rattling. Then, in a state in which the half section of the teeth formed on the processing surface 31 of the roll 30 on the side of the outer diameter is meshed with the guide teeth 44 formed on the floating plate 39 and the half section of the processing surface 31 (the tooth tip of the tooth formed on the processing surface 31) on the side of the inner diameter is pressed against the other end surface of the caulking section 20 in the axial direction, the roll 30 is rotated about the central axis α of the hub main body 8. The rotary press device 33 supports the roll 30 rotatably about the central axis β thereof. For this reason, as the roll 30 is rotated about the central axis α, the roll 30 is rotated (autorotated) about the central axis β in a direction opposite to the rotation direction of the roll 30 about the central axis α on the basis of the meshing between the half section of the teeth formed on the processing surface 31 on the side of the outer diameter and the guide teeth 44.

Figure 4:
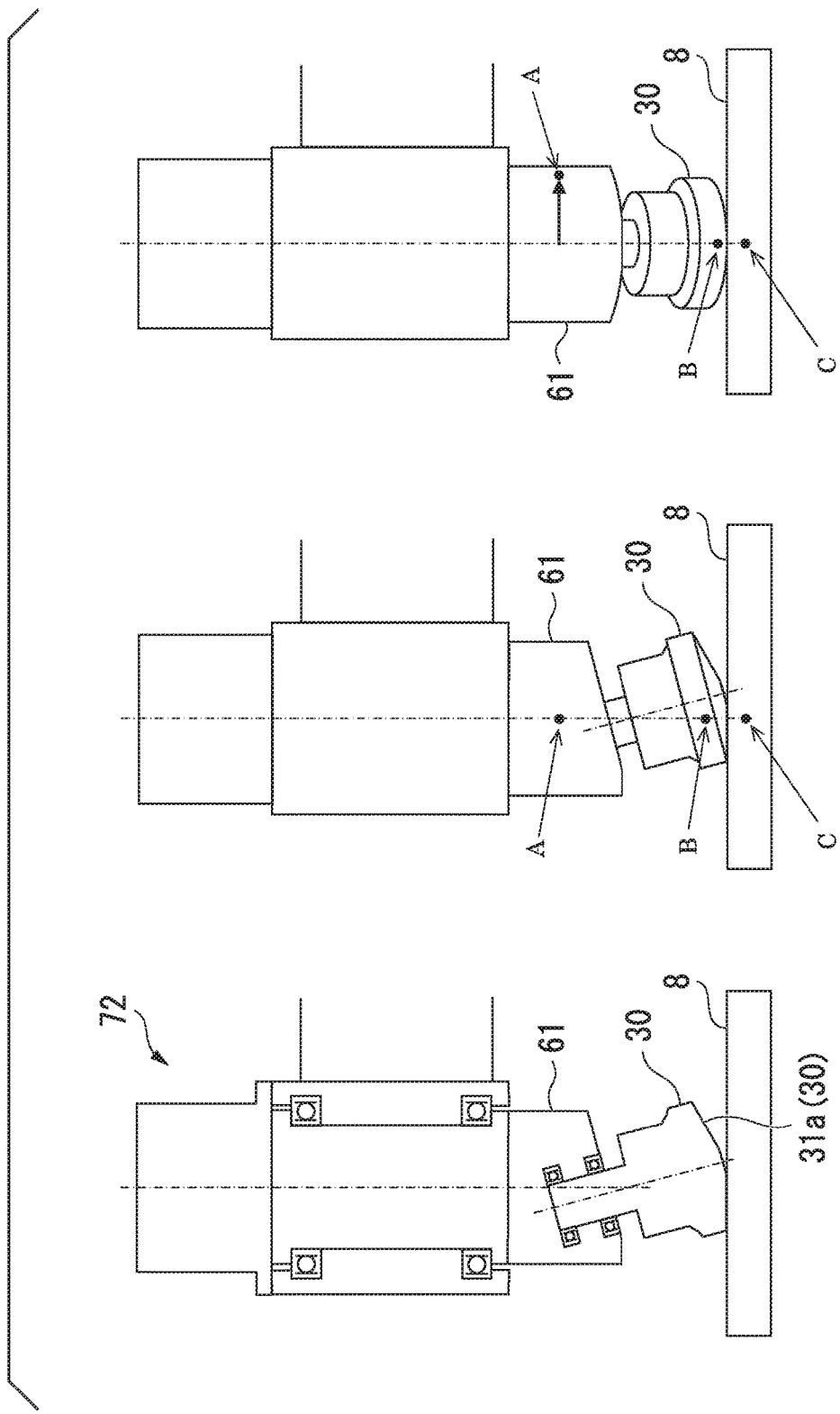
FIG. 4 is a view for describing movement of a roll during rotary forging.
Figure 5:
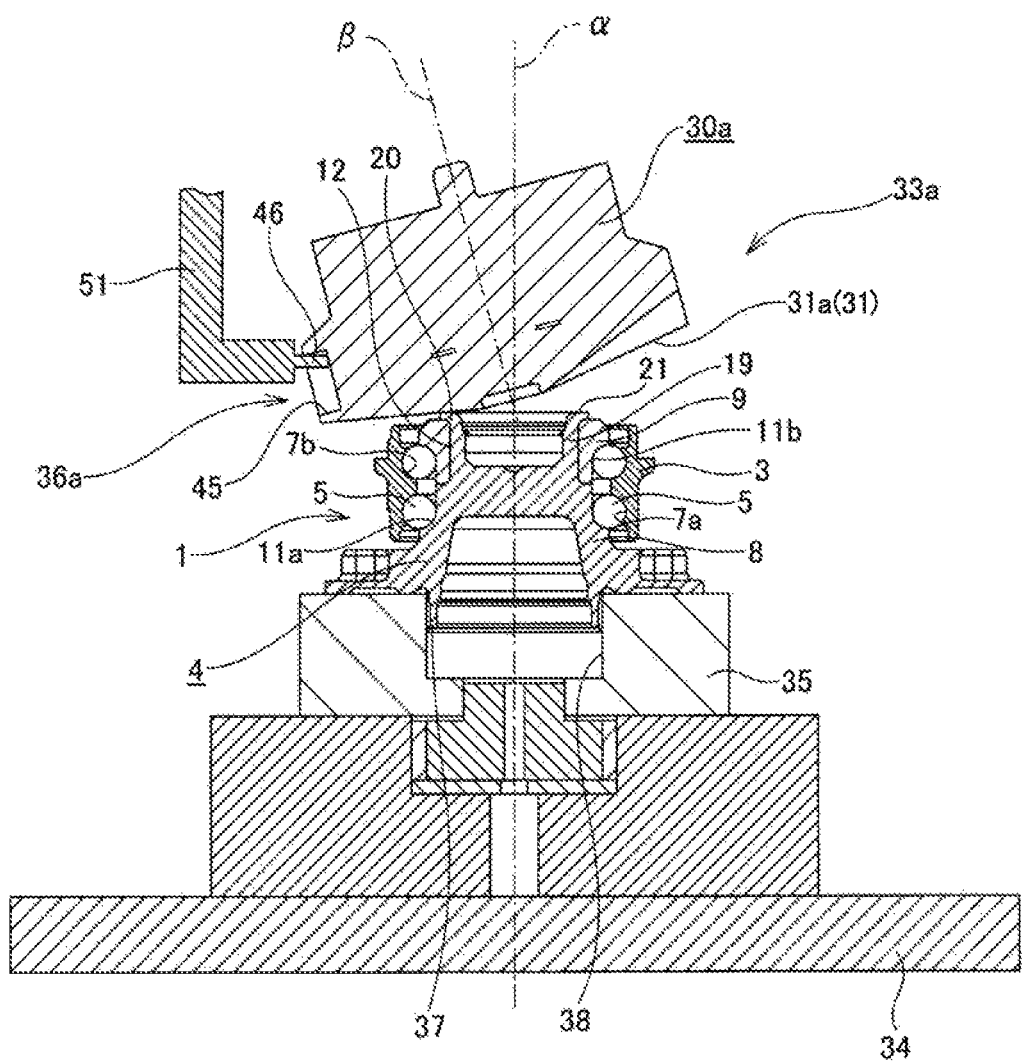
FIG. 5 is a view showing a second example of the embodiment of the present invention, corresponding to FIG. 2.

In the example shown in FIG. 4, the roll 30 is rotated relatively reversely about the central axis thereof with respect to a spindle shaft 61 serving as a shaft that revolves the roll 30. A point A in the spindle shaft 61 moves according to rotation of the spindle shaft 61. Meanwhile, a point C in the hub main body 8 is always disposed at the same place without movement. A point B in the roll 30 is disposed at substantially the same place as the point C because the point B is meshed with the point C. When seen from the spindle shaft 61, the roll 30 is rotated in reverse. The second driving apparatus 72 is not limited to the configuration shown in FIG. 4.

In the example shown in FIG. 1, since the number of guide teeth 44 is equal to the number of teeth formed on the processing surface 31, the roll 30 rotates about the central axis β thereof once in a direction opposite to the rotation direction of the roll 30 about the central axis α while the roll 30 rotates once about the central axis α. That is, rotation of the roll 30 about the central axis α is synchronized with rotation about the central axis β thereof. In other words, each of the teeth formed on the processing surface 31 is meshed with the same tooth among the guide teeth 44 at every rotation of the roll 30 about the central axis α. Accordingly, each of the teeth of the processing surface 31 abuts the same position in the circumferential direction of the other end surface in the axial direction of the caulking section 20 at every rotation of the roll 30 about the central axis α (the same position is pressed).

Accordingly, the face spline 21 (a concavo-convex section in the circumferential direction) is formed on the other end surface of the caulking section 20 in the axial direction, and further, a tooth depth of the face spline 21 is increased. Further, in the case of the example, since the guide teeth 44 are formed on the other side surface of the floating plate 39 in the axial direction supported displaceably with respect to the base 34 in the axial direction, a tooth depth of the face spline 21 is increased, the roll 30 is displaced to one side in the axial direction, and thus the guide teeth 44 are displaced to the one side in the axial direction.

In the case of the above-mentioned example, the half section of the teeth formed on the processing surface 31 on the side of the outer diameter is meshed with the guide teeth 44. For this reason, during the rotary forging, a motion of the roll 30 (for example, a motion of the roll 30 around the central axis of the roll 30) is restricted against movement of the roll 30 around the central axis α of the hub main body 8. That is, movement around the first axis α of the teeth 31a of the roll 30 is restricted in parallel with relative pressing. In addition, as the roll 30 is rotated about the central axis α of the hub main body 8, the roll 30 is forcibly rotated about the central axis β thereof in a direction opposite to the rotation direction about the central axis α (autorotation in a direction opposite to the rotation direction about the central axis α can be caused). In addition, rotation of the roll 30 about the central axis α is synchronized with rotation about the central axis β as described above. Accordingly, even in a state before the face spline 21 is formed on the other end surface of the caulking section 20 in the axial direction (a tooth depth of the face spline 21) is increased, generation of sliding in the circumferential direction can be prevented in the engaging section between the processing surface 31 and the other end surface of the caulking section 20 in the axial direction. That is, whenever the roll 30 is rotated about the central axis α once, a portion of the other end surface of the caulking section 20 in the axial direction pressed by the teeth formed on the processing surface 31 can be prevented from moving in the circumferential direction. As a result, it is possible to prevent the radial stripes 32 and 32 from being formed on the tooth tip of the face spline 21. Accordingly, the other end surface of the caulking section 20 in the axial direction cannot be easily damaged (exfoliated), a meshed state between the face spline 21 formed on the side of the hub and the face spline 26 (see FIG. 11) formed on the outer wheel 2 for a constant velocity joint on the side of the joint can be maintained properly over a long period of time, and a lifespan of the roll bearing unit 1 can be sufficiently secured.

Second Example of Embodiment

Figure 6:
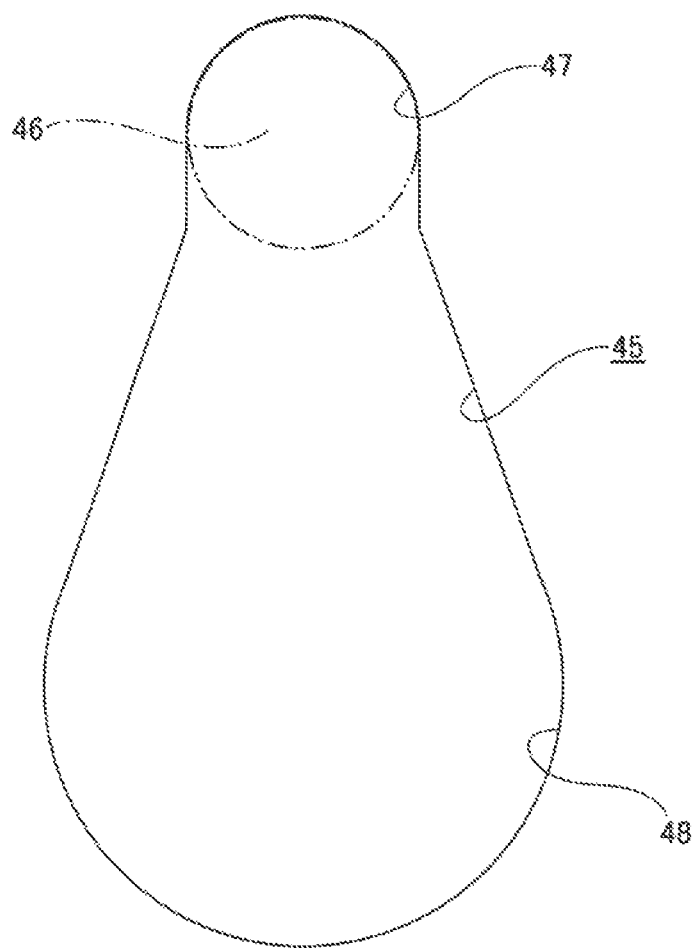
FIG. 6 is a view showing a state of an engaging concave section.
Figure 7:
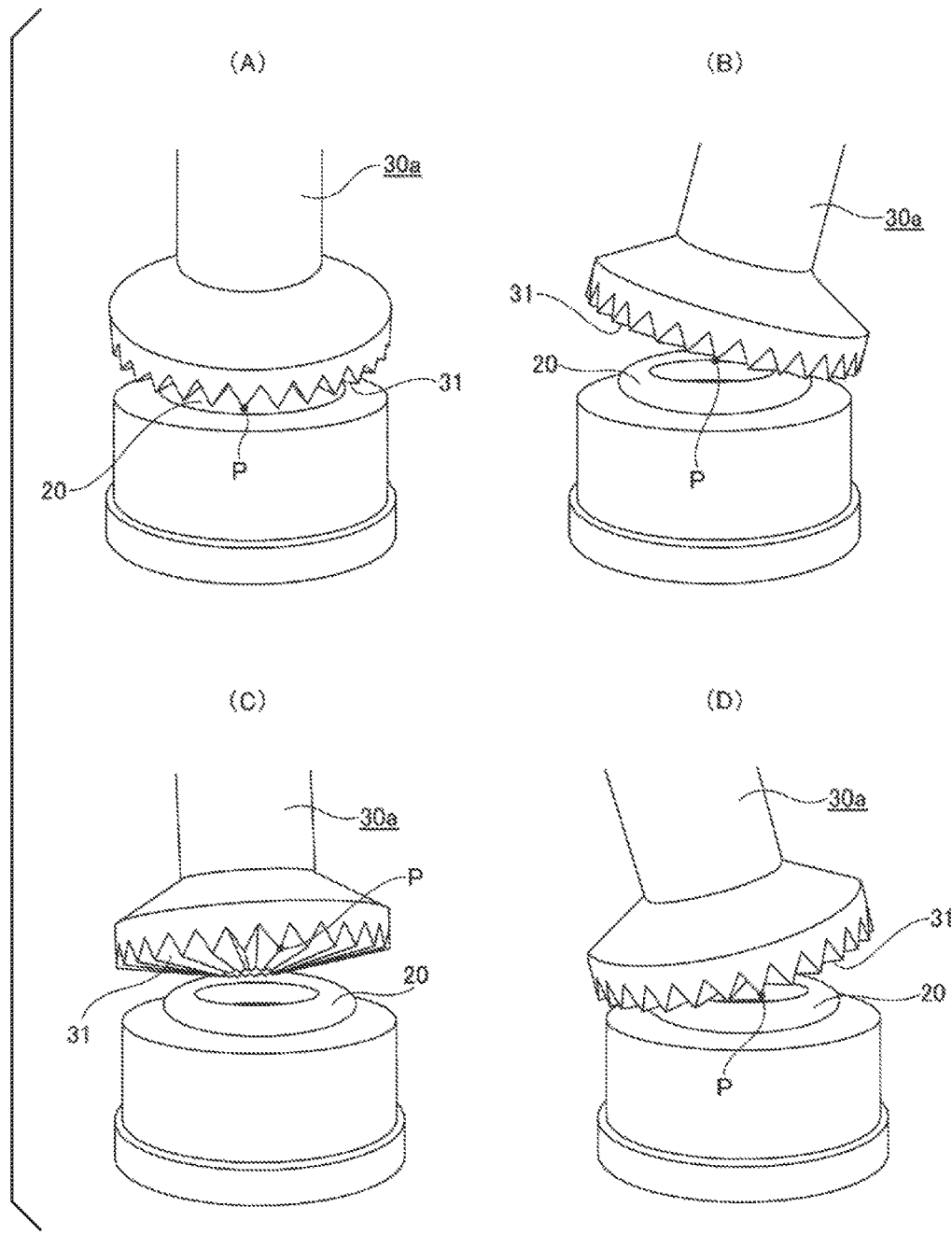
FIG. 7 is a view showing movement of a roll during rotary forging.

FIGS. 5 to 9 are views showing a second example of the embodiment of the present invention. In the case of a rotary press device 33a of the example, the number of teeth formed on a processing surface 31 of a roll 30a is equal to the number of teeth of the face spline 21 that are to be formed on the other end surface of the caulking section 20 in the axial direction. A restriction section 36a that constitutes the rotary press device 33a of the example is constituted by an engaging concave section 45 formed in an outer circumferential surface of the roll 30a, and an engaging pin 46 supported in the radial direction. The engaging pin 46 is supported displaceable toward one side in the axial direction in synchronization with displacement of the roll 30a to one side in the axial direction as a tooth depth of the face spline 21 formed on the other end surface of the caulking section 20 in the axial direction is increased. The restriction section 36a is configured to mechanically restrict movement of the processing surface 31 (the teeth 31a) of the roll 30a around the first axis α according to rotary forging. In the example, the restriction section 36a is configured to restrict a motion of the roll 30a (for example, a motion of the roll 30a around the central axis of the roll 30a) against movement of the roll 30a around the central axis (the first axis) α of the hub main body 8. Specifically, the engaging pin 46 is supported by a ram (not shown) that supports the roll 30a via an L-shaped support arm section 51 such that rotation about the central axis α of the hub main body 8 and rotation about the central axis β thereof is possible. The restriction section 36a has a restriction member (the support arm section 51, the pin 46) having a first end (a pin 46) connected to an outer circumferential surface of the roll 30a and a second end (one end of the support arm section 51) connected to a fixing section (the ram). In the outer circumferential surface of the roll 30a, the engaging concave section 45 with which the pin 46 is engaged is disposed adjacent to the processing surface 31 (the teeth 31a). Further, the support arm section 51 is not rotated during rotary forging. In addition, as shown in FIG. 6, the engaging concave section 45 has a narrow width section 47 having a substantially semi-circular shape, and a wide width section 48 having substantially a teardrop shape, which are continuous with each other. The engaging concave section 45 is formed at an arbitrary place in the rotation direction of the roll 30a about the central axis α (in a state in which a phase in the rotation direction of the roll 30a about the central axis α coincides with a phase of the engaging pin 46a in the circumferential direction). The narrow width section 47 of the engaging concave section 45 and the tip portion of the engaging pin 46 can be engaged with each other in the rotation direction of the roll 30a about the central axis α (in the circumferential direction of the hub main body 8) without rattling.

Here, in the case of the example, the number of teeth formed on the processing surface 31 is equal to the number of teeth of the face spline 21. Accordingly, provided that sliding in the circumferential direction does not occur in an engaging section between the processing surface 31 and the other end surface of the caulking section 20 in the axial direction when rotary forging is performed on the other end surface of the caulking section 20 in the axial direction, arbitrary points P on the processing surface 31 of the roll 30a draw a closed loop trajectory as shown by (A)→(B)→(C)→(D)→(A) of FIG. 7. The trajectory drawn by the points P on the processing surface 31 during the rotary forging will be described with reference to FIG. 8.

First, it is assumed that the points P are on an engaging section (a point $P_0$ of FIG. 8) with the other end surface of the caulking section 20 in the axial direction. In an autorotation coordinate system $(x_1, y_1, z_1)$ in which an original point is an intersection point between the central axis α and the central axis β, and among an $x_1$ axis, a $y_1$ axis and a $z_1$ axis perpendicular to each other, the $y_1$ axis coincides with a forward/rearward direction of FIG. 8, and the $z_1$ axis coincides with the central axis β of the roll 30a, coordinates $P_0(x_1, y_1, z_1)$ of the point $P_0$ are represented as the following Equation (1).

[Math. 1]

$$P_0(x_l, y_l, z_l) = \begin{bmatrix} L\cos\theta \\ 0 \\ L\sin\theta - d \end{bmatrix} \quad (1)$$

Further, θ in Equation (1) represents an inclined angle of the central axis β of the roll 30a with respect to the central axis α of the hub main body 8 (an angle formed between the central axis α and the central axis β). In addition, d in Equation (1) represents a distance between an intersection point between the central axis α and the central axis β and an intersection point between the central axis β and the other end surface of the caulking section 20 in the axial direction (a distance of the central axis β in the axial direction). L in Equation (1) represents a distance between the point $P_0$ and an intersection point between the central axis β and the other end surface of the caulking section 20 in the axial direction (a distance in the radial direction).

During the rotary forging, the roll 30a rotates (autorotates) about the central axis β (the $z_1$ axis) thereof. Coordinates $P_A(x_1, y_1, z_1)$ in the autorotation coordinate system of a point $P_A$ at which the point $P_0$ is rotated about the $z_1$ axis by an angle λ are represented as the following Equation (2).

[Math. 2]

$$P_A(x_l, y_l, z_l) = \begin{bmatrix} \cos\lambda & -\sin\lambda & 0 \\ \sin\lambda & \cos\lambda & 0 \\ 0 & 0 & 1 \end{bmatrix} \begin{bmatrix} L\cos\theta \\ 0 \\ L\sin\theta - d \end{bmatrix} = \begin{bmatrix} L\cos\lambda\cos\theta \\ L\sin\lambda\cos\theta \\ L\sin\theta - d \end{bmatrix} \quad (2)$$

Figure 8:
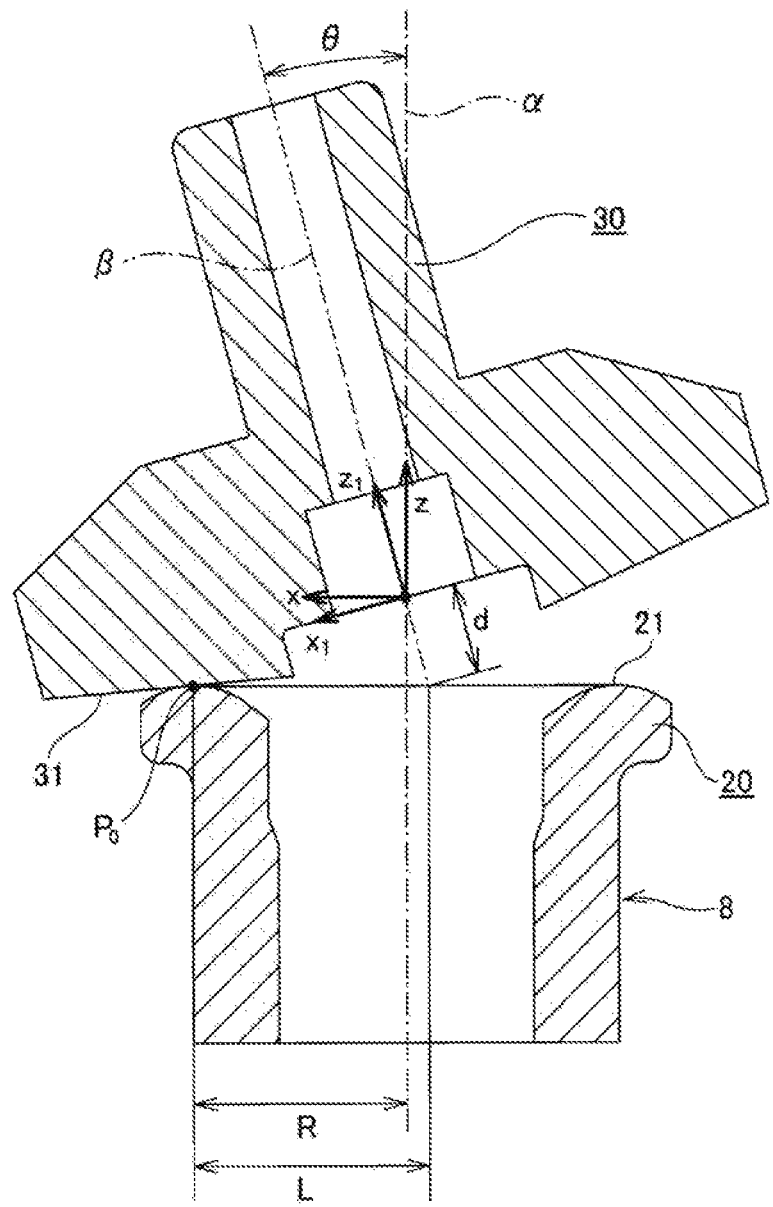
FIG. 8 is a cross-sectional view for describing dimensional relations of respective parts.

When coordinates $P_A(x_1, y_1, z_1)$ in the autorotation coordinate system of the point $P_A$ are represented in (converted into) the rotation coordinate system (x, y, z) in which an original point is set as an intersection point between the central axis α and the central axis β, and among an x axis, a y axis and a z axis perpendicular to each other, the y axis is set to coincide with a forward/rearward direction of FIG. 8, and the z axis is set to coincide with the central axis α of the hub main body 8, they are as shown in the following Equation (3).

[Math. 3]

$$P_A(x, y, z) = \begin{bmatrix} \cos\theta & 0 & \sin\theta \\ 0 & 1 & 0 \\ -\sin\theta & 0 & \cos\theta \end{bmatrix} \begin{bmatrix} L\cos\lambda\cos\theta \\ L\sin\lambda\cos\theta \\ L\sin\theta - d \end{bmatrix} = \begin{bmatrix} L\cos\lambda\cos^2\theta + L\sin^2\theta - d\sin\theta \\ L\sin\lambda\cos\theta \\ -L\cos\lambda\cos\theta\sin\theta + L\sin\theta\cos\theta - d\cos\theta \end{bmatrix} \quad (3)$$

Here, the right side of Equation (3) is substituted with (X, Y, Z).

Meanwhile, during the rotary forging, the roll 30a rotates about the central axis α of the hub main body 8. A rotation angle of the roll 30a about the central axis α (the z axis) when the roll 30a is rotated about the central axis β (the $z_1$ axis) thereof by an angle λ is assumed to be φ. Coordinates $P_B(x, y, z)$ in the rotation coordinate system of a point $P_B$ at which the point $P_A$ is rotated about the z axis by an angle φ are represented as the following Equation (4).

[Math. 4]

$$P_B(x, y, z) = \begin{bmatrix} \cos\phi & -\sin\phi & 0 \\ \sin\phi & \cos\phi & 0 \\ 0 & 0 & 1 \end{bmatrix} \begin{bmatrix} X \\ Y \\ Z \end{bmatrix} = \begin{bmatrix} X\cos\phi - Y\sin\phi \\ X\sin\phi + Y\cos\phi \\ Z \end{bmatrix} \quad (4)$$

Here, provided that sliding in the circumferential direction is not generated in the engaging section between the processing surface 31 and the other end surface of the caulking section 20 in the axial direction, a relation between a rotation angle φ of the roll 30a about the central axis α of the hub main body 8 and a rotation angle λ of the roll 30a about the central axis β thereof is represented as the following Equation (5).

[Math. 5]

$$-\phi = \frac{L\cos\theta}{R} \cdot \lambda \quad (5)$$

Further, R of Equation (5) represents a distance between the point $P_0$ and the central axis α (a distance in the radial direction).

Figure 9:
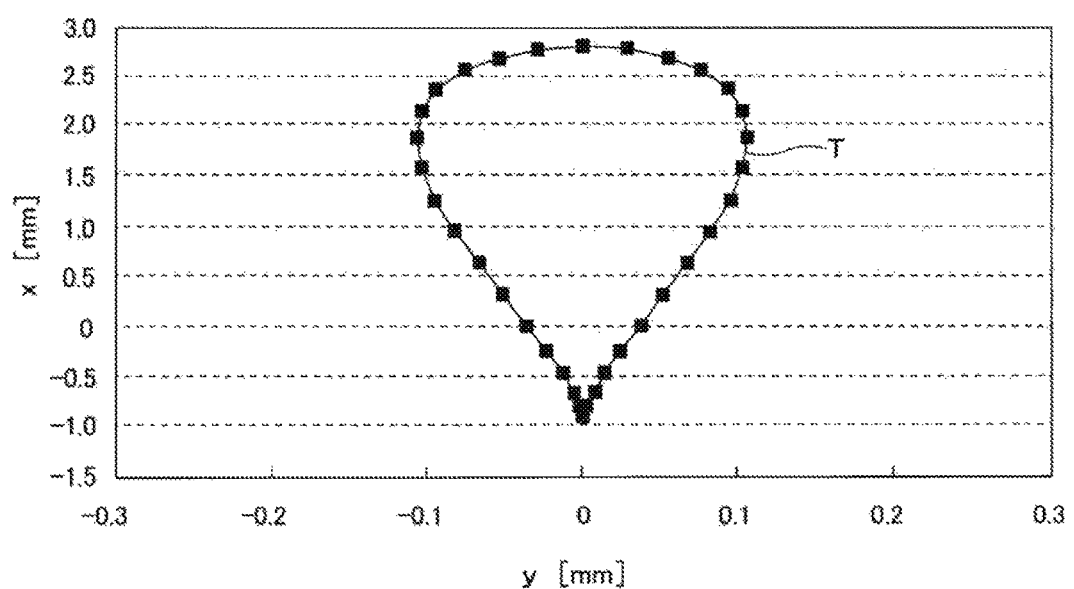
FIG. 9 is a view showing a trajectory depicted by arbitrary points P on a processing surface of the roll.

When Equation (5) is substituted into Equation (4) and a rotation angle φ of the roll 30a about the central axis α is varied from 0 to 360 degrees, during the rotary forging, a trajectory drawn by points P on the processing surface 31 of the roll 30a can be obtained. Specifically, a trajectory T drawn by the points P on a y-z plane (seen from a direction of the x axis) is, for example, a reverse teardrop shape as shown in FIG. 9. Further, in the case of the example of FIG. 9, the distance R is 21.31 [mm], the distance L is 21.39 [mm], the distance d is 0.93 [mm], and the inclined angle θ is 5 degrees.

In this way, according to rotation about the central axis α, the points P on the processing surface 31 of the roll 30a draw the trajectory T having a reverse teardrop shape. For this reason, according to the above-mentioned shape of the engaging concave section 45, the engaging concave section 45 and the tip portion of the engaging pin 46 can be engaged with each other in the circumferential direction of the hub main body 8 at an arbitrary place in the rotation direction of the roll 30a about the central axis α without rattling.

When rotary forging is performed on the other end surface of the caulking section 20 in the axial direction using the rotary press device 33a, first, the engaging pin 46 is engaged with the narrow width section 47 of the engaging concave section 45 in the circumferential direction of the hub main body 8 without rattling. In this case, the processing surface 31 of the roll 30a is pressed against the other end surface of the caulking section 20 in the axial direction, and the roll 30a is rotated about the central axis α of the hub main body 8. Then, engagement between the engaging pin 46 and the narrow width section 47 is released. Here, an inner side surface of the narrow width section 47 (a rear side surface of the roll 30a in the rotation direction about the central axis α) is pressed by the engaging pin 46. Accordingly, during rotary forging, movement of the processing surface 31 (the teeth 31a) of the roll 30a around the first axis α is mechanically restricted by the restriction section 36a. A motion of the roll 30a (for example, a motion of the roll 30a around the central axis of the roll 30a) is restricted by the restriction section 36a against movement of the roll 30a around the central axis (the first axis) α of the hub main body 8. That is, movement of the roll 30a around the first axis α of the teeth 31a is restricted in parallel with relative pressing. In addition, the roll 30a is forcibly rotated about the central axis β thereof in a direction opposite to the rotation direction about the central axis α. Accordingly, even in a state before the face spline 21 is formed on the other end surface of the caulking section 20 in the axial direction (a tooth depth of the face spline 21 is increased), generation of sliding in the circumferential direction in the engaging section between the processing surface 31 and the other end surface of the caulking section 20 in the axial direction can be prevented.

Further, in the case of the example, while the restriction section 36a is formed at an arbitrary place in the circumferential direction, the restriction section 36a may be formed a plurality of arbitrary places in the circumferential direction. When the restriction section 36a is formed at the plurality of arbitrary places in the circumferential direction, the roll 30a can be more reliably autorotated. In addition, in the case of the example, the entire engaging concave section 45 including the wide width section 48 is formed along the trajectory T. However, as the roll 30a is rotated about the central axis α from a state in which the tip portion of the engaging pin 46 and the narrow width section 47 are engaged with each other in the circumferential direction without rattling, the roll 30a is inclined in a direction in which the roll 30a is separated from the engaging pin 46. As a result, engagement between the engaging pin 46 and the engaging concave section 45 is released. Accordingly, the shape of the wide width section 48 in the engaging concave section 45 need not necessarily be shaped along the trajectory T as long as the shape does not interfere with autorotation of the roll 30a. Further, as a relation between a length of the engaging pin 46 and a depth of the engaging concave section 45 is restricted, it is possible to prevent engagement between the engaging pin 46 and the engaging concave section 45 from being released during rotation of the roll 30a about the central axis α. In addition, as the engaging concave section is formed as a closed loop concave groove along the trajectory T and a length of the engaging pin is sufficiently secured, the engaging pin and the engaging concave section can be engaged with each other in the circumferential direction throughout the rotation direction of the roll about the central axis of the hub main body without rattling. Configurations and actions of the other portions are the same as in the first example of the embodiment.

Third Example of Embodiment

Figure 10:
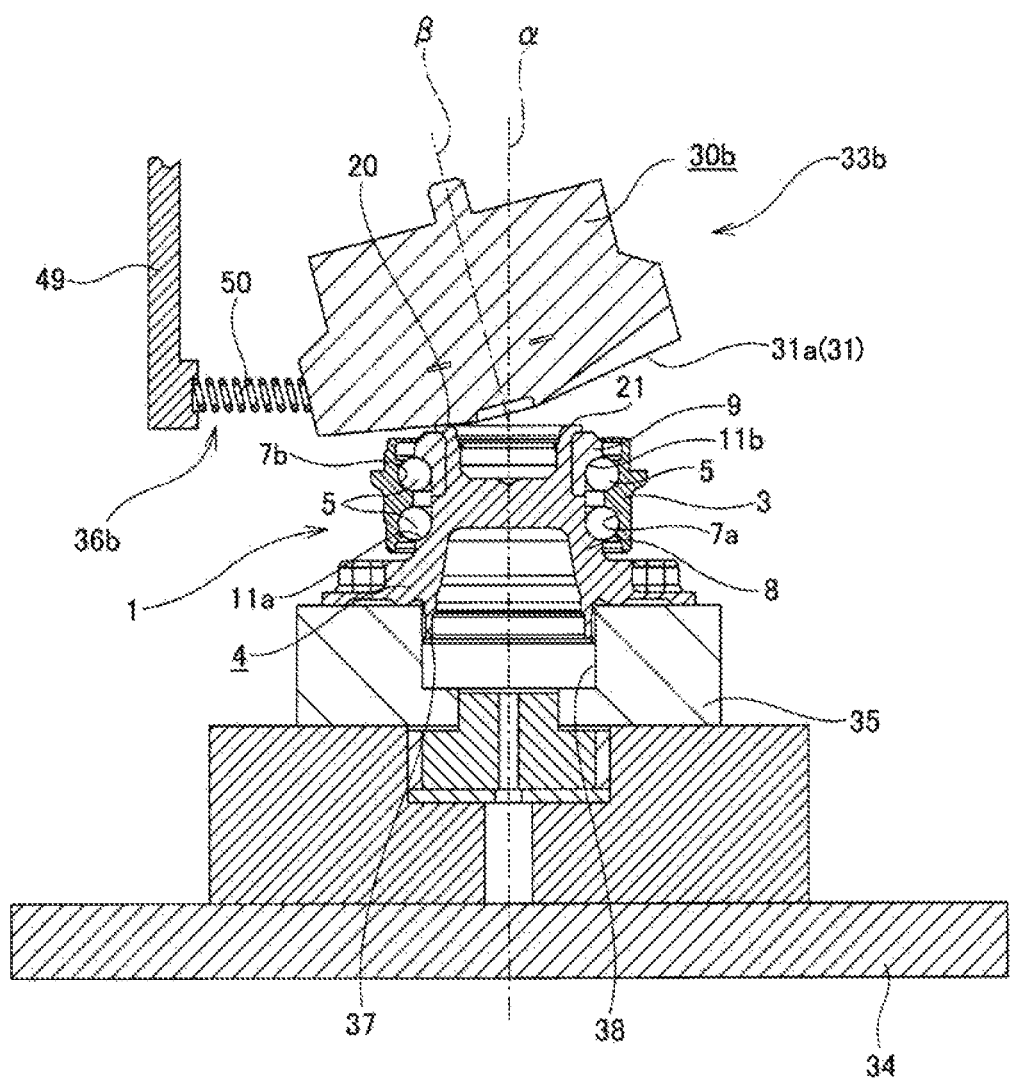
FIG. 10 is a view showing a third example of the embodiment of the present invention, corresponding to FIG. 2.

FIG. 10 shows a third example of the embodiment of the present invention. In a rotary press device 33b of the example, an L-shaped support arm section 49 is supported by and fixed to the other side surface in the axial direction of a ram (not shown) that supports a roll 30b such that rotation about a central axis α of the hub main body 8 and rotation about a central axis β thereof is possible. A restriction section 36b is constituted by installing an elastic member 50 such as a coil spring or the like between a tip portion of the support arm section 49 (an inner end portion of the hub main body 8 in the radial direction) and an arbitrary position on an outer circumferential surface of the roll 30b in the circumferential direction. The restriction section 36b has a restriction member (the elastic member 50, the support arm section 49) having a first end (one end of the elastic member 50) continuous with the outer circumferential surface of the roll 30b and a second end (one end of the support arm section 49) continuous with the fixing section (the ram). In the outer circumferential surface of the roll 30b, a connecting place of the elastic member 50 is disposed adjacent to the processing surface 31 (the teeth 31a). Further, the support arm section 49 is not rotated during rotary forging. Accordingly, an arbitrary place on the outer circumferential surface of the roll 30b in the circumferential direction is elastically pulled toward the tip portion of the support arm section 49 about the central axis α regardless of a rotational position of the roll 30b. For this reason, during rotary forging, movement of the processing surface 31 (the teeth 31a) of the roll 30b around the first axis α is mechanically restricted by the restriction section 36b. A motion of the roll 30b (for example, a motion of the roll 30b around the central axis of the roll 30b) is restricted by the restriction section 36b against movement of the roll 30b around the central axis (the first axis) α of the hub main body 8. That is, movement of the roll 30b around the first axis α of the teeth 31a is restricted in parallel with relative pressing. In addition, when the roll 30b is rotated about the central axis α, rotation (autorotation) of the roll 30b about the central axis β thereof is caused (forced) in a direction opposite to the rotation direction about the central axis α. Accordingly, during rotary forging, generation of sliding in the circumferential direction in the engaging section between the processing surface 31 of the roll 30b and the other end surface of the caulking section 20 in the axial direction can be prevented. Further, the restriction section 36b may be formed at a plurality of places in the circumferential direction of the hub main body 8. Configurations and actions of the other portions are the same as in the first example of the above-mentioned embodiments.

INDUSTRIAL APPLICABILITY

When the present invention is performed, the structure of the restriction section that constitutes the rotary press device is not limited to the structure of each example of the above-mentioned embodiments. The bearing is not limited to the roll bearing. The bearing unit is not limited to the hub unit.

REFERENCE SIGNS LIST

1 Wheel support bearing unit
2 Outer wheel for constant velocity joint
3 Outer wheel
4 Hub
5 Rolling element
6 Standstill-side flange
7a, 7b Outer wheel trajectory
8 Hub main body
9 Inner wheel
10 Rotation-side flange
11a, 11b Inner wheel trajectory
12 Small diameter step section
13 Center hole
14 Small diameter section
15 Bolt
16 Rod section
17 Male screw section
18 Head section
19 Cylindrical portion
20 Caulking section
21 Hub-side face spline
22 Mouth section
23 End wall section
24 Shaft section
25 Screw hole
26 Joint-side face spline
27 Inner wheel for constant velocity joint
28 Ball
29a, 29b Holder
30, 30a, 30b Roll
31 Processing surface
31a Tooth
32 Stripe
33, 33a, 33b Rotary press device
34 Base
35 Holder
36, 36a, 36b Restriction section
37 Cylindrical portion
38 Concave holding section
39 Floating plate
40 Circular hole
41 Through-hole
42 Guide post
43 Cushion mechanism
44 Guide tooth
45 Engaging concave section
46 Engaging pin
47 Narrow width section
48 Wide width section
49 Support arm section
50 Elastic member
51 Support arm section
71 First driving apparatus
72 Second driving apparatus
73 Controller

The invention claimed is:

1. A method of manufacturing a roll bearing unit comprising an end and an other end in an axial direction, and further comprising a hub main body having an inner wheel trajectory formed on an outer circumferential surface of an intermediate section of the hub main body in the axial direction, and an inner wheel having an inner wheel trajectoryon an outer circumferential surface of the inner wheel and that is fitted onto a portion of the hub main body at the other end in the axial direction, the method of manufacturing the roll bearing unit comprising:
forming a hub-side face spline on a surface of a caulking section, disposed at the other end, in the axial direction by performing rotary forging that rotates a roll about a central axis of the hub main body in a state in which a processing surface of the roll inclined with respect to the central axis of the hub main body and rotatably supported about the central axis thereof is pressed against the surface of the caulking section in the axial direction, in order to make a roll bearing unit having the hub-side face spline serving as a concavo-convex section in a circumferential direction on the surface of the caulking section in the axial direction by pressing the surface of the inner wheel in the axial direction and fixing the inner wheel to the hub main body by using the caulking section formed by plastically deforming a cylindrical portion formed on the portion of the hub main body in the axial direction outward in a radial direction,
wherein, during the rotary forging, the hub-side face spline is formed on the surface of the caulking section in the axial direction in a state in which a restricting part, which restricts a motion of the roll around the central axis of the roll against movement of the roll around the central axis of the hub main body, surrounds the surface of the caulking section in the axial direction.

2. The method of manufacturing the roll bearing unit according to claim 1,
  wherein a motion of the roll around the central axis of the roll is restricted against movement of the roll around the central axis of the hub main body during the rotary forging by surrounding the surface of the caulking section in the axial direction with guide teeth serving as a concavo-convex section in the circumferential direction and by meshing the guide teeth and some of teeth formed on the processing surface of the roll.

3. The method of manufacturing the roll bearing unit according to claim 2,
  wherein the guide teeth are displaceably supported in the axial direction in a state in which an elastic force is applied toward the other side in the axial direction.

* * * * *